US005584051A

United States Patent [19]

Göken

[11] Patent Number: 5,584,051

[45] Date of Patent: Dec. 10, 1996

[54] RADIO BROADCAST TRANSMISSION SYSTEM AND RECEIVER FOR INCOMPATIBLE SIGNAL FORMATS, AND METHOD THEREFOR

[75] Inventor: Klaus Göken, Celle, Germany

[73] Assignee: Thomson Consumer Electronics Sales GmbH, Hanover, Germany

[21] Appl. No.: 211,894

[22] PCT Filed: Oct. 26, 1992

[86] PCT No.: PCT/EP92/02448

§ 371 Date: Jul. 25, 1994

§ 102(e) Date: Jul. 25, 1994

[87] PCT Pub. No.: WO93/09615

PCT Pub. Date: May 13, 1993

[30] Foreign Application Priority Data

| | | | |
|---|---|---|---|
| Nov. 1, 1991 | [DE] | Germany | 41 36 068.0 |
| Nov. 29, 1991 | [DE] | Germany | 41 39 264.7 |

[51] Int. Cl.$^{6}$ .................... H04B 1/00

[52] U.S. Cl. .................... 455/68; 455/38.2; 455/45; 455/93; 455/142; 375/216

[58] Field of Search .................... 455/200.1, 291, 455/219, 220, 221, 38.1, 38.2, 69, 70, 180.1, 132, 133, 98, 179.1, 184.1, 185.1, 186.1, 228, 229, 93, 142, 45; 375/216, 217

[56] References Cited

U.S. PATENT DOCUMENTS

| | | | |
|---|---|---|---|
| 5,119,397 | 6/1992 | Dahlin et al. | 375/5 |
| 5,239,306 | 8/1993 | Siwiak et al. | 340/825.44 |
| 5,239,681 | 8/1993 | Parnall et al. | 455/38.1 |
| 5,303,401 | 4/1994 | Duckeck et al. | 455/186.1 |
| 5,333,155 | 7/1994 | Dambacher | 375/122 |
| 5,392,463 | 2/1995 | Yamada | 455/93 |
| 5,428,664 | 6/1995 | Kobayashi | 379/58 |
| 5,438,689 | 8/1995 | Kluth | 455/267 |

FOREIGN PATENT DOCUMENTS

| | | |
|---|---|---|
| 4006933 | 9/1991 | Germany . |
| 4006931 | 9/1991 | Germany . |
| 4039117 | 10/1991 | Germany . |

OTHER PUBLICATIONS

RTM Rundfunktechnische Mitteilungen, vol. 35, No. 2, Apr. 3, 1991, Norderstedt, Germany, pp. 45–66, Von Georg Plenge "Dab–Ein Neues Horrundfunksystem Stand Der Entwicklung Und »ege Zu Seiner Einfuhrung".

*Primary Examiner*—Reinhard J. Eisenzopf
*Assistant Examiner*—Lee Nguyen
*Attorney, Agent, or Firm*—Joseph S. Tripoli; Frederick A. Wein; Peter M. Emanuel

[57] ABSTRACT

The present invention provides for an analog and/or digital radio broadcast transmission system and radio receiver therefor, which includes a control signal having an item of control information concerning another, different type of transmission/receive system. The receiver is a hybrid receiver able to receive both types of signals. When the same program material is available on both of the different systems, the control signal is used for switching the different systems so that the receiver receives the program on the system which provides the best reception.

20 Claims, 10 Drawing Sheets

RADIO BROADCAST TRANSMISSION SYSTEM AND RECEIVER FOR INCOMPATIBLE SIGNAL FORMATS, AND METHOD THEREFOR

There are VHF-FM and/or AM radio receivers with which, in a known way, an analog VHF-FM and/or AM radio signal is received and processed, and the corresponding audio and/or video signals reproduced in a suitable manner. Such radio (broadcast) receivers—hereinafter also designated as analog radio receivers—are available in various configurations as audio and/or video broadcast receivers with and without a recording unit. Not only radio broadcasts but also the conventional sound transmission of television broadcasting is realized using frequency modulation (FM).

From the research report BBC RD 1982/2 of the British Broadcasting Corporation "L.F. Radio Data: Specification of the BBC experimental transmissions 1982", August 1982, "Specifications of the Radio Data System RDS for VHF-FM sound broadcasting", EBU, Document Tech. 3244-E (March 1984), a method for transmitting auxiliary information—called radio data system, RDS for short, (=DIN EN 50067)—exclusively for VHF-FM and/or AM radio broadcasts is known with which, on the transmitter side, a subcarrier and/or the AM radio signal carrier is modulated with an auxiliary information or identification signal and in which, on the receiver side, the subcarrier or, respectively, the AM radio signal carrier is demodulated with regard to the auxiliary information signal, and the decoded auxiliary information obtained is used for tuning and/or reproduction purposes in a VHF-FM and/or AM radio receiver.

Recently, radio broadcast systems and associated transmission and receiver devices as well as parts thereof have been developed with which, in addition to VHF-FM and/or AM and PAL as well, non-compatible radio signals (DAB, DSR, MAC) can be transmitted in digitally coded form, received, processed and reproduced in a suitable manner. While with DSR (=digital satellite radio) the transmission of the digitally coded audio broadcast signals is realized via satellite and/or cable transmission paths in the 12 GHz and/or 118 MHz range, with DAB (=Digital Audio Broadcasting) besides the satellite transmission, above all the terrestrial transmission in the VHF range is provided in a digitally operated common-frequency network, whereby the information of, for example, six stereo stations (stations) is transmitted interlaced with each other distributed over a total of 1536 carrier frequencies (multiple "digital" frequencies) of a 1.5 MHz multiplex signal. DAB, like DSR too, permits a high quality reproduction of the audio signal in CD quality.

Digital radio broadcasting via radio satellites and/or cable routes has been available since 1986 in the Federal Republic of Germany and is known, for example, from the brochure "Digitaler Hörfunk über Rundfunksatelliten" (Digital radio via broadcasting satellites), an information brochure of the Bundesminister für Forschung und Technologie (Federal Minister for Research and Technology), 1982. The DSR devices realized up to now are, however, only capable of receiving and processing digitalized radio broadcast signals. The alternative reception of analog radio broadcast signals on the conventional wavebands VHF, MW, SW and LW is neither possible nor planned owing to the non-compatibility between analog and digitalized radio signals.

Furthermore, within the scope of the European research project EUREKA 147-DAB, a digital audio radio broadcast transmission system DAB is being developed as a successor to the present VHF broadcasts. The basic principles of DAB are described in the magazine "Funkschau", issue 8, 1990, "Funkschau Spezial" section, pages 9 through 18. Here, the only requirement (page 16) is that with a DAB automobile radio, the reception of the classic wavebands should be possible as has been the case up to now.

In the following DAB will be used as the general term for broadcasting techniques or systems in the audio and/or video sectors in which the sound and/or video signals as well are transmitted (at least in part) in digitally coded form. VHF-FM and/or AM radio broadcasting will be used in the following as the general term for broadcasting techniques or systems in which the sound signals are in any way frequency—and/or amplitude-modulated and/or the video signals, for example, like with PAL or SECAM, are not transmitted in time-division multiplex like with MAC.

After the introduction of DAB, the present VHF broadcasts will exist in parallel with it for many years for reasons of compatibility—a so-called simulcast transmission—in order to be able to operate the existing VHF-FM receivers in the usual manner during this transition period.

The tuning to the multiple carrier frequencies of each DAB radio broadcast signal which lie in the existing television (VHF) range as well as the special DAB signal demodulation is performed in a DAB receiver section, whereas a channel and, exclusively, a source decoding (with error correction and error masking) of the digitalized broadcast signals is carried out in the DAB decoder. Retrofitting of existing FM and/or AM radio receivers with DAB receiver sections and DAB decoders is, in theory, possible but would involve a lot of expense and create a multitude of difficulties, for example, space problems.

It is the object of the invention to develop an analog and/or digital radio broadcast transmission system as well as a radio receiver for this without much expenditure on circuitry, rendering possible a rapid switchover to the best reception of a desired station (station), broadcast over various transmission channels not compatible with each other.

According to the invention, a terrestrial multi-band radio broadcast transmission system for VHF-FM and/or AM radio broadcasts is proposed in which, using a VHF-FM and/or AM radio signal of a station, a first control signal is transmitted as a transmission-specific identification signal which is decoded and processed by a VHF-FM and/or AM radio receiver using a suitable control signal decoder upon reception of the radio signal. The first control signal is allocated to or defined for the same station or program as the station being currently received or, respectively, another transmission system, for example, DAB, which is in no way compatible with the VHF-FM transmission system. In addition, the first control signal also contains, optionally, information concerning in which frequency range and/or with which station location (channel) the corresponding DAB station is to be received. Hereby, the first control signal is used to control a radio receiver for digital broadcasts (DAB, DSR, MAC) which is combined with or can be connected to the VHF-FM receiver. Here, from the presence of the first control signal as such it can already preferably be deduced that the station is transmitted via DAB.

Consequently, information on radio broadcast transmission systems such as DAB, DSR or MAC, D2-MAC, HD-MAC, PAL PLUS, etc., all completely technically different from the VHF-FM/AM system, is transmitted With the first control signal. The first control signal preferably contains all switchover and/or control parameters for the radio receiver for digital broadcasts (DAB, DSR, MAC) which is to be controlled, so that a rapid switchover from VHF-FM and/or AM reception to DAB reception is possible.

The first and/or second control signal is preferably only broadcast if the same station or the same program is being transmitted in two different transmission systems. If a station is only regional, if at least temporarily this condition is no longer fulfilled, then the control signals are not transmitted.

With analog broadcasting—VHF-FM and/or AM broadcasts will also be referred to as such in the following—the first control signal is preferably transmitted within the RDS data stream so that the first control signal is decoded by the RDS decoder and fed to a digital radio receiver which is connected or coupled to the analog radio receiver in some way. A digital radio receiver connected to the VHF-FM receiver is controlled, for example, switched on and caused to receive a certain station signal, using the first control signal being fed in. Further, the analog radio receiver is controlled, for example, automatically muted, with the first control signal if the digital radio receiver takes over the reproduction. RDS or rather, the transmission of the first control signal with RDS, serves according to the invention in a surprising way, therefore, as a decisive technological key or link element between the existing analog radio and the future broadcasts like DAB, although RDS according to its original definition, is only and exclusively provided for analog broadcasting. Remote control of a DAB (VHF-FM and/or AM) radio receiver according to the invention via the VHF-FM and/or AM (DAB) transmission channel, simplifies the operation of the receiver concerned in a rational way.

As an alternative to the first or second control signal, for example, a pilot carrier known from the television transmission system or signal similar to ARI (Autofahrer Rundfunk Information—broadcast information service for drivers) or a certain auxiliary frequency or a certain phase value can be used, whereby such a control signal is preferably transmitted outside the RDS transmission channel.

For coordinating the digital and analog radio receiver, both receivers or receiver sections are connected with each other via at least one trip (control) line. A control data evaluation circuit is provided in at least one of the two receivers which evaluates the signals transmitted via the trip line and brings about a control of the two receivers.

It is proposed to construct a combination radio receiver which contains a first radio broadcast receiver section for the reception, processing and reproduction of analog radio signals, such as VHF-FM and/or AM, and a second radio broadcast receiver section for the reception, processing and reproduction of digitally coded radio signals (DAB, DSR), whereby one or more common componentries, in particular a common control unit, are provided for both radio broadcast receiver sections. Thus, one or more components, such as aerial, RF/IF stage, operating elements, loudspeaker(s), LF signal processing, auxiliary data decoder, display, voltage supply and further suitable circuit sections, etc., can be provided only once in the radio receiver but being assigned to both radio broadcast receiver sections. Thereby, a compact design of the radio receiver can be achieved which, as an unlimited mobile, portable and non-portable receiver, makes impressively clear to the user the benefits of digital reception like DAB compared to existing VHF-FM reception.

The radio receiver according to the invention is not only capable of receiving and processing both analog and digitally coded audio and/or video broadcast signals, on the contrary it distinguishes itself particularly in that individual suitable components or componentries only have to be provided once in the radio receiver, whereby preferably several of the aforementioned radio broadcast signals, such as PAL/MAC or VHF-FM/DAB, can be received, processed and reproduced without the reproduction quality of the audio signal received being impaired. Through providing individual components or componentries only once for both receiver sections, a cost-effective realization of such a hybrid receiver can be attained, whereby the use of materials and resources is limited to what is essential and the componentries or components provided as common items are utilized in the best possible way.

Such an invention-type radio receiver has, in particular, the advantage that with the introduction of DAB, analog radio broadcasts on the classic wavebands can continue to be received and reproduced just as in the past, whereby the features and the reproduction quality linked with this is considerably improved. Apart from that, the user of a radio receiver according to the invention is not dependent on knowing when DAB in which national or European scope is introduced and VHF-FM broadcasts are gradually or completely abolished. Even following the complete abolition of individual or all analog VHF-FM radio broadcast signals, an invention-type radio receiver can still be used.

In particular, through using a common control unit for the digital and analog receiver sections, the best possible adjustment of the receiver and its reproduction quality is ensured. In addition, simple operation can thereby be achieved.

It is a great advantage for an analog/digital radio receiver as described above if, upon the introduction of DAB, a first control signal is also transmitted with an analog radio signal within the VHF-FM radio signal, as already described, and said control signal can be used for user information as well as for switching over from analog signal reproduction to digital signal reproduction and vice versa.

Using such a multi-band VHF-FM <⇆> DAB Control signal transmission allows further considerable advantages to be achieved for the radio-receiver according to the invention.

With the above-mentioned RDS system, for example, a list of alternative VHF-FM frequencies (AF code) of the same VHF-FM and/or AM radio station is transmitted. If now the VHF-FM radio receiver according to the invention is set to, for example, VHF-FM reception and receives there the station NDR 2 on 99.8 MHz, it is therefore sensible, if the same station is then also offered via DAB, to transmit, as a further alternative frequency, a "digital" multiple frequency of the DAB broadcast with the value of the corresponding station location of the desired station in the DAB data stream within the AF list of the VHF-FM signal. This "digital" AF and/or the value of the station location of the desired station represents the first control signal which by means of a control signal decoder, here an RDS decoder in the analog receiver, can be decoded and correspondingly processed in a data processing unit. The analog/digital radio receiver can then be adjusted by means of the data processing unit in such a way that upon receiving such a first control signal, switchover to DAB reception takes place in order to achieve the best possible reproduction quality.

It is also serves the object to also transmit the data from alternative frequencies of the AM or VHF-FM radio signals via a DAB auxiliary signal channel of the digital station signal. The data format of the DAB auxiliary data channel is preferably compatible with the RDS data format so that an RDS data evaluation circuit can be used also for the evaluation of the DAB auxiliary signals. If, for example, a mobile receiver approaches to the broadcasting limit of a digital station signal to which said receiver is currently tuned and which is currently being reproduced, then the reproduction can be broken off abruptly. In such a case, a switchover to alternative analog VHF-FM or AM reception can be effected in good time whereby the corresponding station can also continue to be received outside the DAB broadcasting zone if the AM or FM reception area is larger than the DAB broadcasting zone which, for example, can well be the case due to long-distance reception phenomena concerning analog broadcasting. However, coded information concerning the number of radio stations transmitted in a COFDM multiplex signal is preferably also transmitted in the DAB auxiliary data channel, whereby this information can be used on the receiver side for the evaluation of and tuning to the desired station.

BRIEF DESCRIPTION OF THE DRAWINGS

The invention is explained in more detail in the following by means of several possible embodiment examples. The drawings show.

DETAILED DESCRIPTION OF THE PREFERRED EMBODIMENTS

Figure 1A:
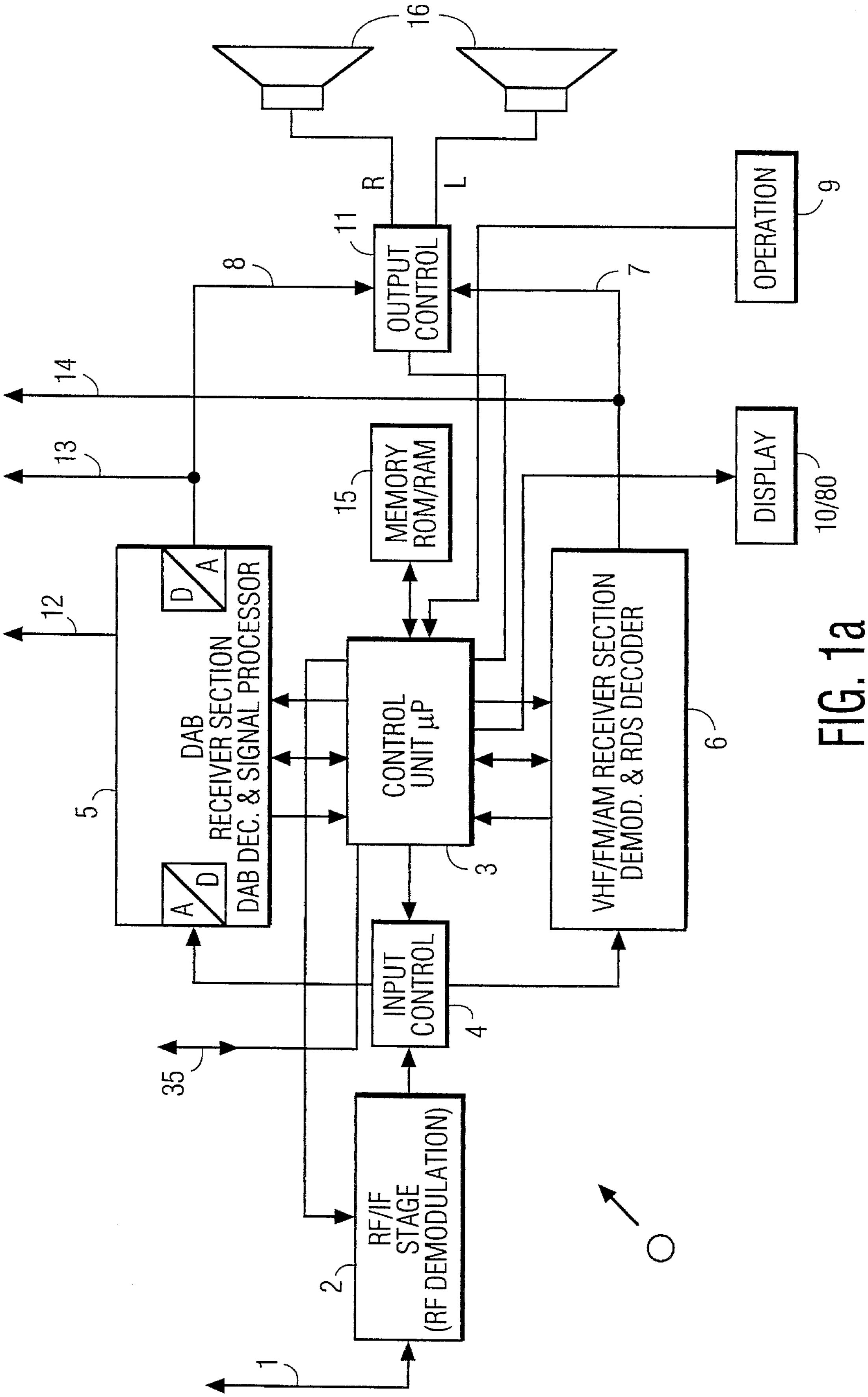
FIG. 1*a* a radio receiver according to the invention formed by a radio receiver for the reception of digitally coded audio broadcast signals and/or VHF-FM and/or AM broadcast signals.

FIG. 1*a* shows a radio receiver 0 which is capable of receiving, processing and reproducing in a suitable way both DAB broadcast signals and VHF-FM/AM broadcast signals. Hereby, individual componentries for a digital receiver section 5 are also commonly used for a VHF-FM/AM receiver section 6. Such a radio receiver can be designated as a hybrid receiver because it has two receiver sections 5 and 6 or rather, an analog and a digital receiving path, which are completely different in principle, while as many componentries or circuit elements as possible are combined or "married" for both receiving paths.

Figure 8:
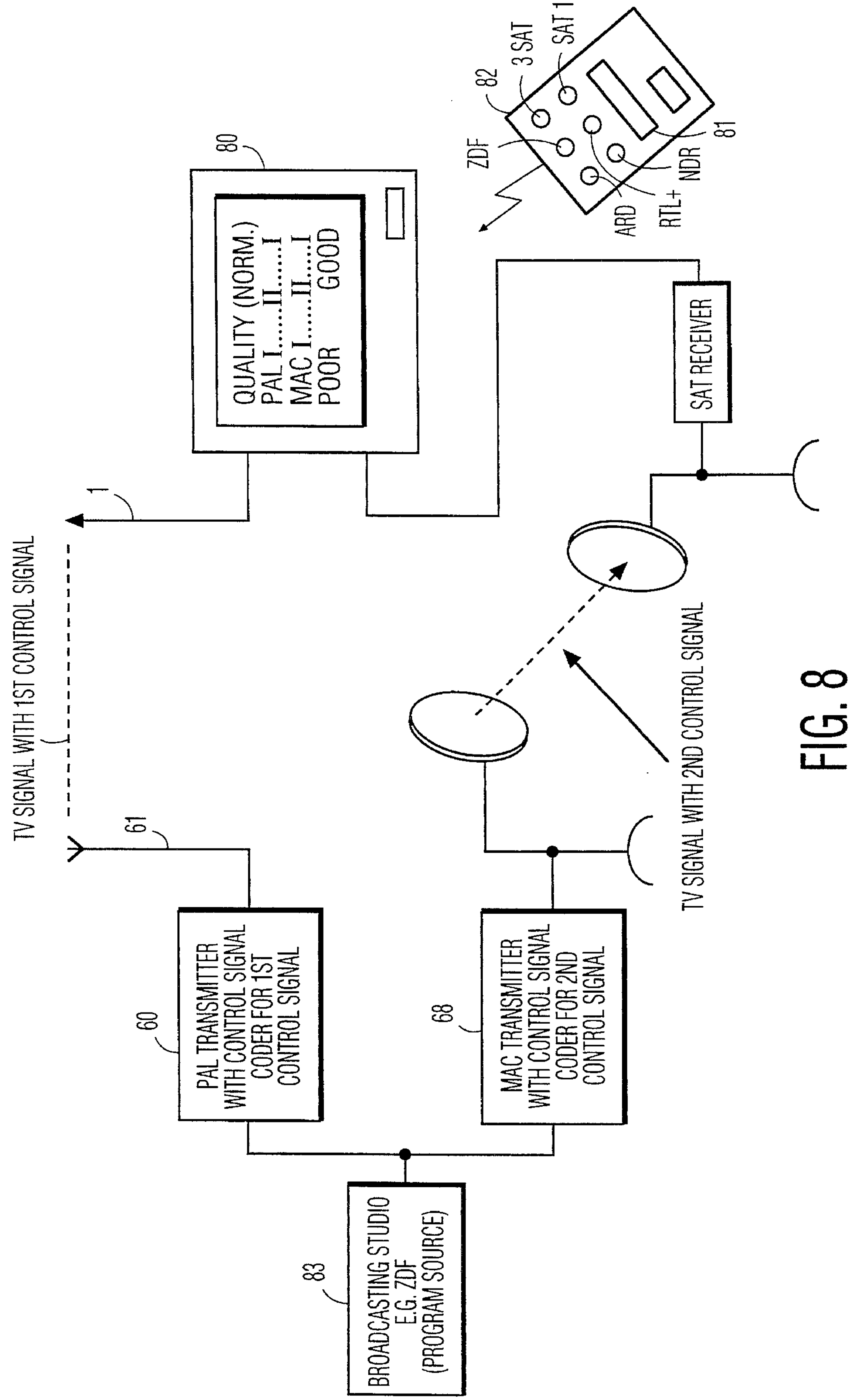
FIG. 8 a block circuit diagram of a transmitter and receiver arrangement for television according to the invention.

Such a radio broadcast receiver can also be a television receiver 80 according to FIG. 8 comprising combined circuits for receiving and processing both analog and digital audio and/or video signals which are transmitted in one or more of the known standards like PAL, SECAM, NTSC, PALPlus, MAC, D2-MAC, HD-MAC, etc. Auxiliary signals such as the first or second control signals can be transmitted in a vertical blanking interval like the VPS or television text signals, separately or together with these signals.

Figure 1B:
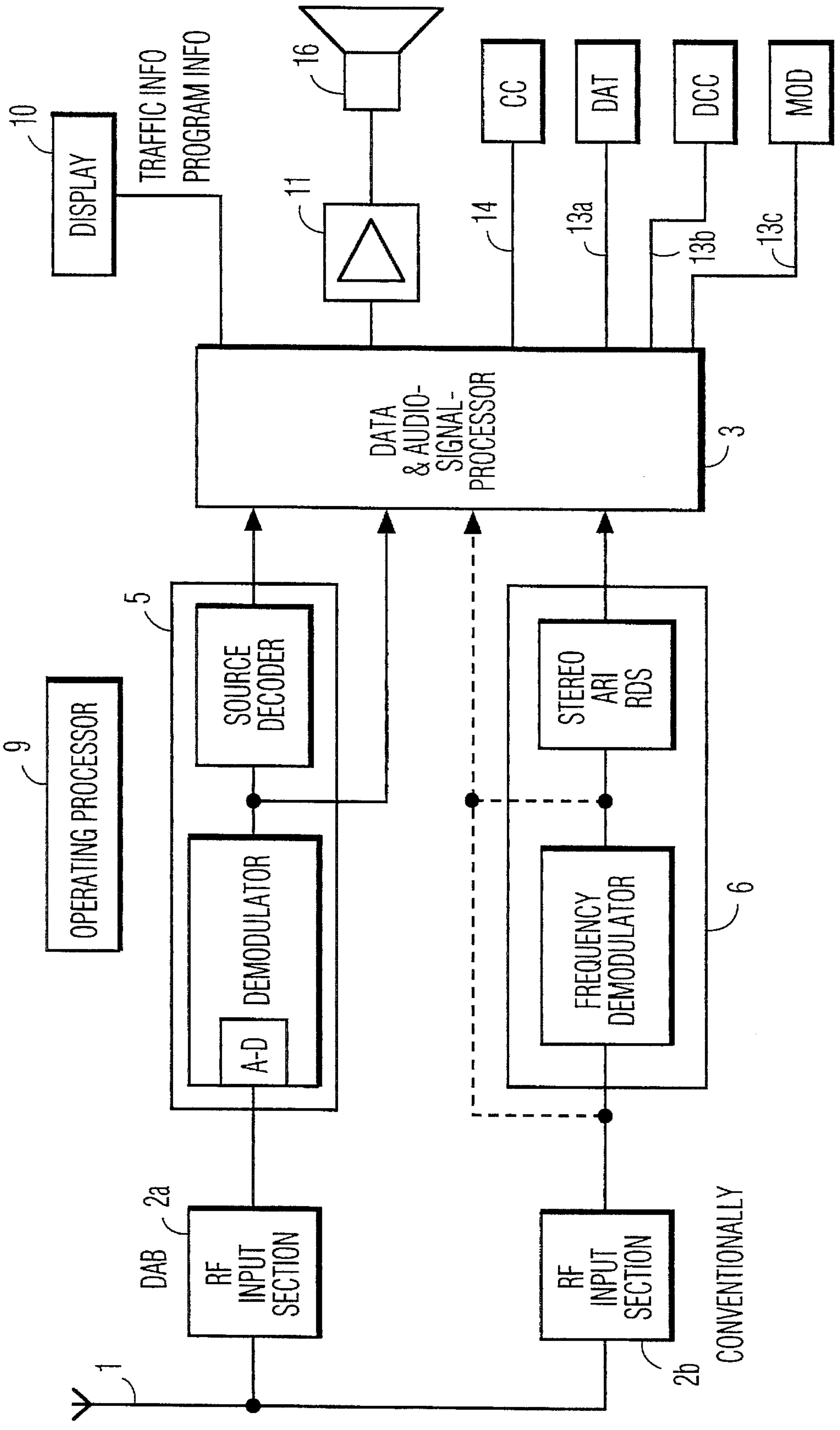
FIG. 1*b* an alternative representation to FIG. 1*a;*

Both the analog and the digitally coded broadcast signals are received from the transmitters via an aerial 1 and fed to a common RF/IF stage 2. If the DAB reception frequencies lie in the existing transmission spectrum for VHF-FM/AM, then a single RF/IF stage 2 tuning unit or rather, tuner suitable for the transmission spectrum can be used. If the DAB transmission/reception frequency lies outside the existing transmission spectra for radio broadcasting, then the reception frequency of the RF/IF stage 2 must be extended to this frequency or generally two or more separate RF/IF stages 2*a* and 2*b* according to FIG. 1*b*, each of which can be adjusted to the necessary frequencies, are used for both receiver sections 5 and 6. Under certain conditions, like with satellite/terrestrial reception, it is an advantage if the radio receiver comprises RF/IF stages which are optimized and/or adapted for each receiving path 5 and 6 and/or RF/IF modules which are standardized and can be exchanged because this allows the observability of the respective receiving path to be improved. Herewith, a switchover of various stations from DAB to VHF-FM or vice versa without time delay upon switchover and, consequently, without breaks in the reproduction can be achieved without any problems. If the frequency range of DAB or VHF-FM is redistributed, then, accordingly, only the RF/IF stages or modules designed for this need to be exchanged.

The tuning of RF/IF stage 2 is realized by a common central control circuit or control unit (microprocesor) 3. An input control circuit 4, also referred to as a splitter, controlled by the control unit 3 conveys the received signal to the DAB receiver section 5 or to the VHF-FM/AM receiver section 6. It is also possible to feed the signal present at the output of the RF/IF stage directly to both receiver sections 5 and 6. The circuit 4 can then be omitted in certain circumstances. It would also be of advantage to commonly accommodate the receiver 0 shown in FIG. 1 in a single housing so that a compact design is ensured which hardly exceeds the space requirements of existing analog receivers.

In a DAB-specific digital signal processing circuit contained in the DAB receiver section 5, the audio signals, received digitally coded but transmitted in analog form, are digitalized by means of an analog-to-digital converter. By designing the RF/IF stage 2 accordingly as a digital RF/IF stage or RF demodulator, the digitalization of the received signals can be carried out there and then. The actual digital signal processing is dealt with by at least two large-scale integrated circuits—an IF signal processor and an audio signal processor—in the DAB receiver section (neither of which is illustrated). Besides a channel selection and a channel decoding of the digital broadcast signals transmitted in multiple frequencies according to the COFDM (Coded Orthogonal Frequency Division Multiplex) technique (described in "Advanced digital techniques for UHF satellite sound broadcasting", EBU Technical Centre, September 1988), with a channel decoder and a source decoding performed according to psycho-acoustic viewpoints in accordance with the MUSICAM (=Masking pattern adapted Universal Subband integrated Coding And Multiplexing) decoding technique with a DAB source decoder which, for example, also contains a polyphase filter for subband decoding, the audio processor will also perform audio functions like influencing the tone, volume, fading-over control, balance, etc. realized with analog circuit technology in today's receiver designs.

MUSICAM is a technique for the base band coding of audio signals. By utilizing pycho-acoustic phenomena it achieves, in contrast to, for example, a linear coding with 16 bit/48 kHz per monosignal, a data reduction of 96 kbit/s, i.e. a reduction by a factor of eight. COFDM represents the channel coding in DAB and essentially solves the problem of terrestrial multipath reception. In fact echo signals make a positive contribution to the wanted signal. The key to this is the subdivision of the data stream to many, for example, 1536, carriers with 4-PSK modulation of the individual carrier, orthogonal carrier arrangement, the introduction of a protective interval for utilizing the multipath signals and an interleaving of the station signals in the time plane. For selecting a station, a DAB tuner will be capable of being tuned to each of the COFDM frequency positions (all lying within one frequency range, for example, TV channel 12), whereby the COFDM decoder selects a stereo signal from this multiplex signal.

The RF/IF part 2 (or splitter) built according to conventional technology, supplies a signal from which the IF signal processor in the DAB circuit 5 extracts the data stream contained therein. The data stream is built up in the form of frames, each frame comprising firstly a top part, a so-called header, which contains the status information of the frame. A further part of the frame contains data which is suitable for error recognition (error check). A next part of the frame represents the actual digitalized audio data or, respectively, audio scanning values. A further part of the frame, the so-called stuffing bits, is arranged between the audio data and the scale factor protective bits. The decoder can use the information from the protective bits, which are formed as parity bits or CRC (cyclic redundancy code) words, for the scale factor error correction or masking. A further part of the frame is auxiliary signals, so-called "programme associated data", which are partly already located in the header and are defined on the transmitter side.

Following digital-to-analog conversion, an LF audio signal is made available at the output of DAB circuit 5 for further processing and reproduction.

In VHF-FM and/or AM receiver section 6, an LF signal is gained in a known way from the prefiltered VHF-FM/AM signal of the RF/IF pre-stage by mixing in the mixing stage, demodulating in a demodulator, and amplifying and LF-processing in an LF stage, etc, and then said LF signal is made available at the output of the circuit 6.

Both receiver sections 5 and 6 are connected to a central control unit 3 or data and audio signal processor via unidirectional and/or bidirectional trip (control) lines, and are controlled or, respectively, switched on/off by this. Hereby, using an operating unit 9, the respective desired station can be set in the desired setting individually for each receiving path. By means of the central control unit 3, realized as a microprocessor, always one of the signal outputs 7 or 8 of the circuits 6 or 5 is now muted and, therefore, the desired audio signal is reproduced at the loudspeakers 16. The output control circuit 11 controlled by the central control circuit 3 is suitable for muting as well as for LF signal processing; said output control circuit comprises inputs which are connected to the outputs 7 and 8 of the two receiver sections 5 and 6. At locations where such is required, shielding means (not showns) are provided which prevent individual componentries to be interfered with by others.

Using an operating unit 9, a corresponding operation and programming of the two receiver sections of the hybrid receiver can be carried out via the central control unit 3. A common display 10 or picture screen 80 shows the desired information such as station name and/or band (channel) name concerning the digital or the analog radio reception as well as operating and/or program steps. Using the multi-band control signal transmission, it is possible to quickly indicate all the band names via which the desired station can be received.

The DAB-specific digital signal processing circuit 5 comprises a digital output 12 over which the digitally coded auxiliary and/or wanted data and/or control signals are output and recorded and played back using a recording and/or playback device such as DAT, DCC, MOD connected to the hybrid radio receiver. The digital output 12 is preferably connected to the output of the channel decoder so that, in a DAB recorder connected to output 12, the data-reduced data can be picked up (recorded) and reproduced as 16-bit PCM signal using a DAB source decoder. Furthermore, the hybrid radio receiver comprises a first analog output 13 whose analog values—as far as their information contents are concerned—essentially correspond to the digitalized values at output 12 of the DAB-specific digital signal processing circuit 5. The signals from this output can also be picked up by means of a connected recording and/or playback device.

In addition, the hybrid radio receiver comprises a second analog output 14 which is connected to the output of the FM/AM signal processing circuit 6. Both analog outputs can also be physically designed as a single output at which the LF signal to be reproduced or the first or second control signal is always present and, for example, is checked by a comparison measurement unit. It can be advisable to provide a separate unidirectional and/or bidirectional data input and/or output line 35 also for control unit 3, whereby control data from the control unit is made available at an output of the receiver via said line, and/or control data, for example, information like a CT (Clock Time and Date) code known from RDS or information concerning the mode of transmission, is fed via said line to the control unit for programming whereby said control data can then be stored or, respectively, fed to a recording and/or playback device for controlling of such.

Moreover, the hybrid radio receiver comprises a central memory 15 in which the auxiliary signals transmitted with the analog radio signals as well as with the digital radio signals, and the first and/or second control signals are stored and can be used in a suitable way for tuning or signal processing or, respectively, controlling the individual circuits or circuit sections. Apart from that, further data processing programs and/or data for controlling the tuning, station setting, reproduction, operation, display, etc. are stored in memory 15. The RDS signals, DAB auxiliary signals and/or the first and second control signals are processed and evaluated by the central control unit 3. A pre-evaluation of the above-mentioned signals using separate data processing and control circuits (not illustrated) in the VHF-FM receiver section 6 and the DAB receiver section 5 is, however, possible and can also be advantageous.

Figure 2A:
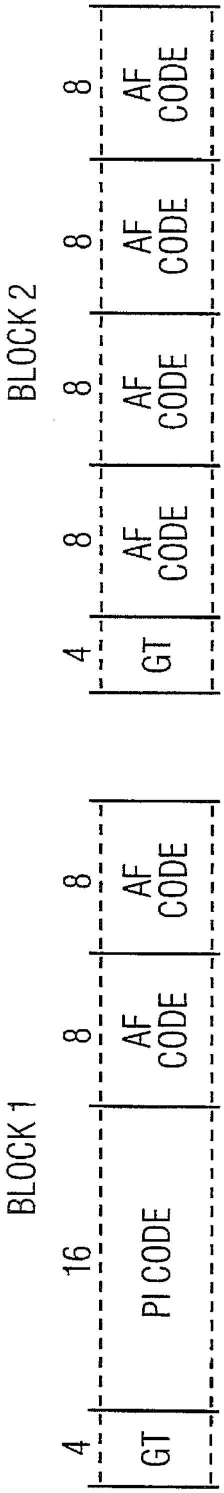
FIG. 2a PRIOR ART
FIG. 2*a–c* various RDS data formats of the group type 2.

FIG. 2*a* shows the data format of group type Two of the RDS data format. This data format is known from the RDS specification quoted. GT is the 4-bit long group type code, in this example for group two. The PI code (station chain (network) identification) consists of one code (16 bit) which allows the receiver to differentiate between nationality, program range/language area and station code. The PI code is not provided for direct display, it is individually assigned to each radio broadcast station and serves for the recognition of VHF-FM transmitters which broadcast the same station. Through this, the receiver section 6, in conjunction with an RDS decoder contained in it and the central control unit 3, is made capable of searching automatically for an alternative VHF-FM frequency for the case that with mobile reception, the transmitter tuned to will become too poor. The AF code consists of one code (8 bit) which contains an alternative carrier frequency for the station listed in the PI code.

Figure 2B:
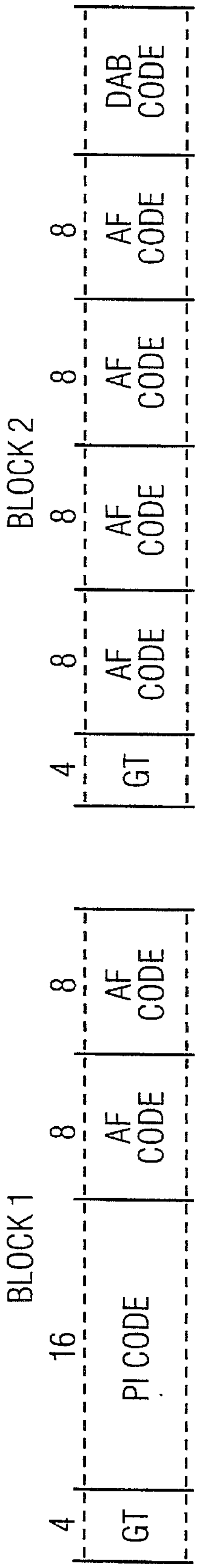
Figure 2C:
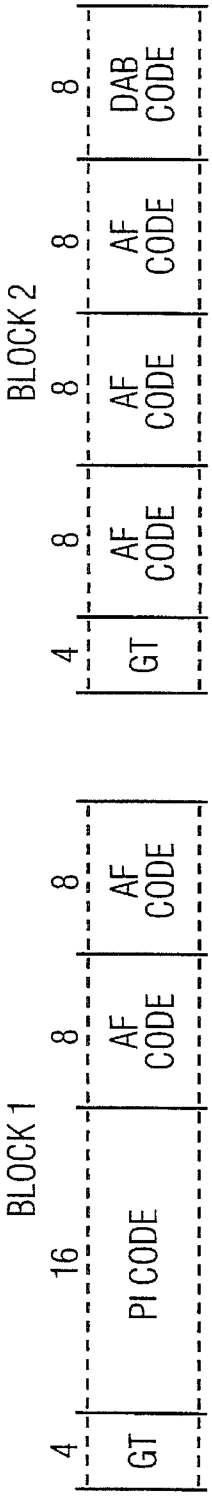
Figure 6:
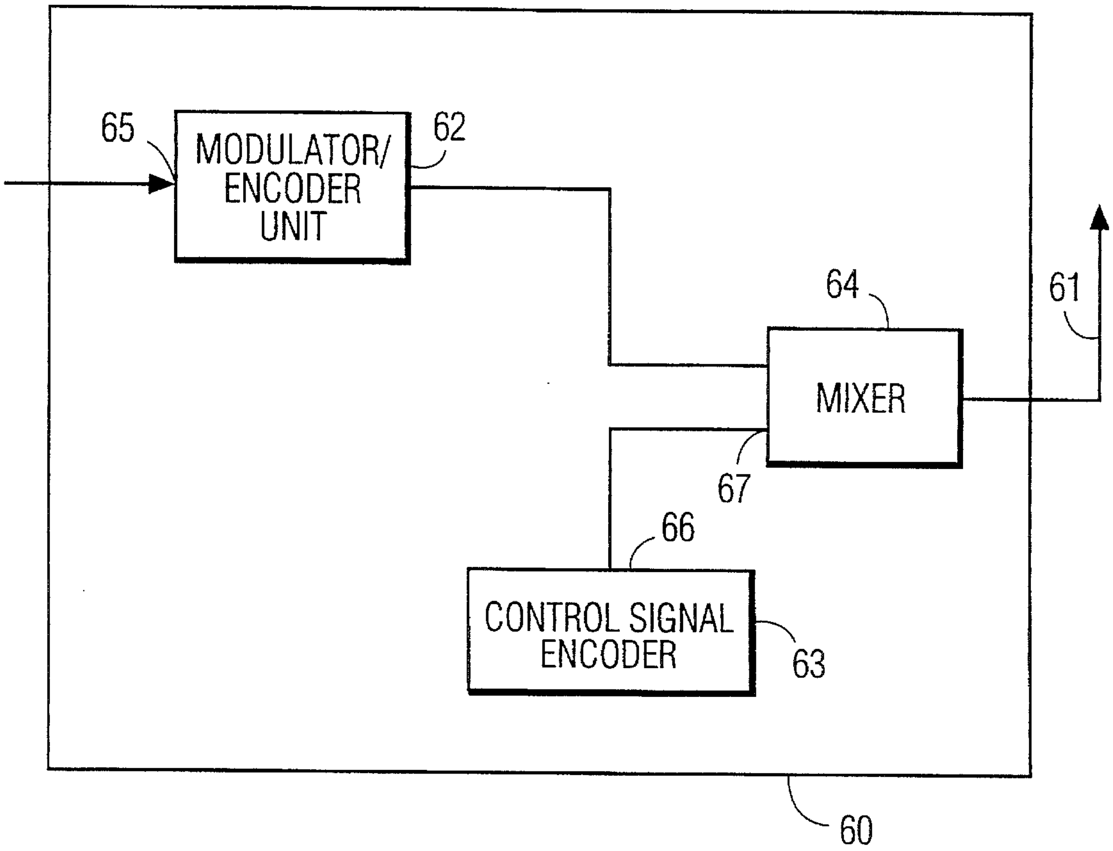
FIG. 6 a block circuit diagram of a transmitter arrangement.

FIG. 2*b* shows the data format according to FIG. 2*a* extended by a first control signal or second piece of identification data (claim 8) or control information, broadcast by a VHF-FM/AM transmitter 60 according to FIG. 6. FIG. 2*c* shows a data format with which the length of the data format remains the same as according to FIG. 2*a* but an AF code is replaced by 8-bit information concerning a DAB station channel. While in the data format according to FIG. 2*b* the block length of the format is extended and the number of AF codes remains the same as that of FIG. 2*a*, the block length in FIG. 2*c* coincides with the data format in FIG. 2*a* but with one AF code word less. The data format according to FIG. 2*c* can under certain conditions exhibit some advantages upon data processing using conventional RDS decoders. For reliable transmission the digitalized first control signal is provided with its own error protection or, respectively, special error-correcting data. The presence of the DAB code designed as a first control signal, primarily investigated in the radio receiver 0 with RDS decoder, as such allows the radio receiver to quickly determine that the station or program being currently received via VHF-FM is also being transmitted and may be received via DAB. However, the DAB code contains, alternatively, besides data on the frequency range over which the multiple frequencies are distributed, also the information at which station location the station is situated in a data frame having several station locations with several stations (in this respect see DSR specification). Preferably, a group of individual carrier frequencies of a data frame in the DAB code or also, for example, the stations distinguishing mark NDR 2 or the corresponding PI code and further control signals for the DAB receiver section 5, is contained in the DAB code.

Instead of inserting a DAB code in the list of AF codes, other markings in the RDS data format can also be made, for example, a group type number GT typical for DAB broadcasting which has no application or is not provided in present VHF-FM broadcasting. As the group type number is always present at the start of each block, such a marking with the DAB-specific GT, for example, a GT number not yet allocated between the numbers 8 and fourteen, is a great advantage under certain conditions for a quick evaluation, in particular then if after the DAB-specific GT, the appropriate station location in the DAB range corresponding to the current station or radio program is present so that the corresponding station location can be called up immediately. In addition, when using a DAB-specific GT number, absolutely no compatibility problems occur for the present RDS decoders/receivers and their evaluation circuits because these ignore a GT number not defined for them.

If an RDS signal according to FIG. 2*b* or 2*c* is received, then the RDS recorder or rather, the data processing and control circuits (FIG. 5) allocated to it, for example, the central control unit 3, registers by means of the evaluation of the first control signal that a certain station or program, for example, NDR 2, can also be received via DAB. If NDR 2 is called up by the user via the operating unit 9, then the hybrid radio receiver switches over either automatically or after actuation of a key 30 to DAB reception using the DAB receiver section 5, and switches off the VHF-FM receiver section or switches it to a stand-by mode or continues to receive the tuned VHF-FM station which is muted, however. An alternative frequency is under certain conditions no longer called up. Therefore, best possible reproduction quality is attained. Switching over from FM reception to DAB reception can, therefore, by realized as quickly as possible without the user needing to perform such a switchover his/herself. If the first control signal or, respectively, the DAB code, cannot be decoded or evaluated after one or more attempts, then the desired station is called up via the preset VHF-FM frequency or an alternative frequency, with which the best reception is possible, is searched for by means of a known PI and/or AF code evaluation.

Figure 7:
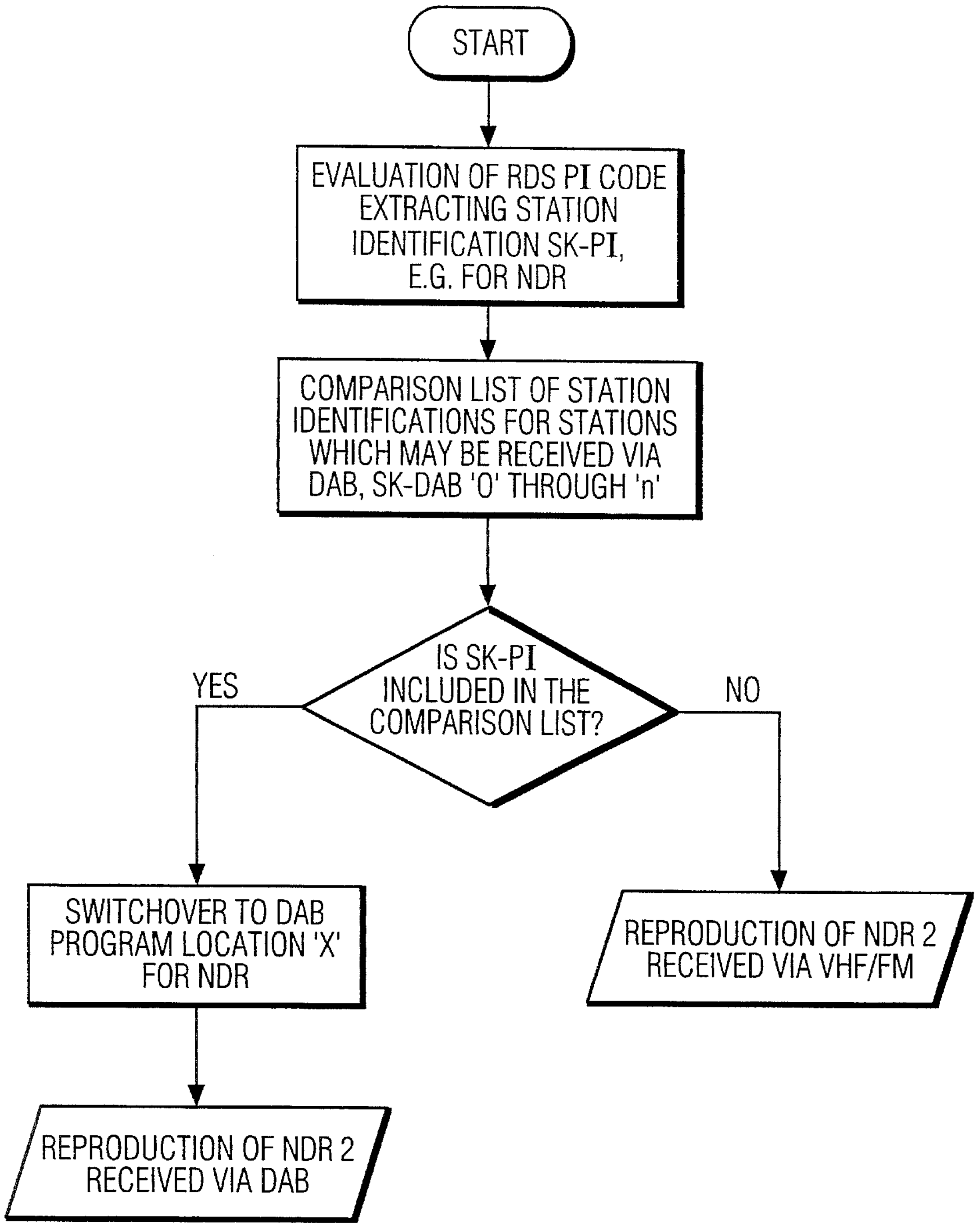
FIG. 7 a flow chart of a PI code evaluation.

However, even using the data format according to FIG. 2*a* it is possible for a receiver to establish whether the station being currently received is also being transmitted and may be received in digitally coded form. For this, for example, according to FIG. 7, the PI code is evaluated in the control unit 3 assigned to the RDS decoder. Hereby, the station identification of the PI code, for example, "NDR 2", can be established as a binary value. Using a comparison list stored in memory 15, containing the station identifications of broadcasters which transmit their stations also via DAB or DSR, and by means of comparing the station identification being currently received with the comparison list, the switchover criterion for DAB or DSR reception can be established within a very short space of time. The comparison list is preferably stored until it is replaced by a new comparison list. As it is possible to transmit several DAB stations and further data channels on a "digital" frequency simultaneously, merely specifying the "digital" frequency with the DAB code according to FIG. 2*b* or 2*c* is insufficient for switchover under certain conditions so that subsequent comparison of the PI codes of both transmission systems with or without comparison list can be necessary.

When the station identification signal SK-PI for NDR 2 coincides with one of the station identification signals SK-DAB 0 . . . 'n' listed in the comparison list, either automatic switchover to DAB reception of the desired station takes place or it is indicated to the user so that switchover by means of pressing a certain key, for example, key 30 on the operating unit 9 (FIG. 3), can be performed. Used as the control signal for switching on a certain station in the DAB receiver section or receiver is, therefore, in this case, the PI code of the RDS signal as a first partial control signal, and this is evaluated accordingly. Instead of the PI code, however, other information from the radio data information such as identification of the traffic program stations TP the PS code (station name or name of the station network) can also be evaluated as a switchover criterion. Therefore, when entering the station name, for example, "NDR 2", via an input unit 9 provided for this (for example, a speech recognition system which converts the human voice into electrical operating commands), the best reception of the desired station can always be guaranteed in a simple manner.

If the radio receiver is, as already mentioned, a television receiver, for example, according to FIG. 8, then upon receiving a station via PAL originating from a broadcasting studio 83, a corresponding first control signal is also transmitted if the same station is, for example, also transmitted via MAC using a satellite and, for example, "MAC" is displayed on the television screen. In a television receiver 80 which can receive and process both PAL and MAC television signals, upon reception of such a station switchover to MAC reception, for example, D2-MAC or HD-MAC, is performed either automatically or after operating a "MAC/PAL" key 81 on the remote control 82, therefore offering the user the television signal with the technically best audio/video quality. Hereby, with such a television device, not only monitoring of the station identification signals may be carried out but also the reception or, respectively, transmission quality of the corresponding station signal not being reproduced at that moment can be measured constantly. Therefore, checking and comparing radio signals conveyed by various transmission paths to the receiver, like PAL and MAC signals, is possible simultaneously. Through appropriate standardization on one basis, also the result of the comparison can be indicated to the user, in conjunction with an OSD (on-screen display) programming, in a mode provided for this purpose (see FIG. 8), therefore easing the decision to switch over. Here, station identifications such as ARD, ZDF, NDR, SAT1, etc. are preferably directly and permanently assigned to the keys of the remote control so that the user need not memorize the allocation of the station keys.

If the aforementioned radio receiver is constructed as a MAC/PAL video recorder or DAB/VHF-FM recording device, then a recording of a program transmission is performed in, for example, the MAC operating mode in which the best sound and/or video quality can be guaranteed. Here as well, the first or second control signal can be used as the switchover criterion for a PAL or MAC recording of a station transmitted via PAL or MAC.

If now upon DAB reception in a mobile hybrid receiver it is established that the DAB signals are in fact strongly disturbed but that the errors can still be corrected, then the hybrid receiver switches over to NDR 2 in VHF-FM reception as soon as received field strength or rather, a value representative of this, like the error detection rate BER, drops below a predetermined threshold. Thereby, an abrupt breaking-off of the DAB reception is avoided if the hybrid receiver is transported ever further away from the broadcasting zone of the DAB signals. In such borderline situations it has become apparent that the FM reception has better properties—called "graceful degradation"—under certain conditions. Exploiting the hybrid receiver for the graceful degradation is, therefore, sensible and advantageous. A rapid switching-on or switching-off of the receiver sections 5 and 6 by means of the central control unit can happen without problems, in particular if the respectively switched-off receiver section is in a stand-by mode or the muted receiver section 5 or 6 receives the same station as the non-muted receiver section 6 or 5. Using an addressable intermediate memory (not illustrated) controlled by control unit 3, it can also be achieved, without any further input, that a switchover between the receiver sections does not create any disturbing break in reproduction, either short or long.

Apart from that, in the DAB circuit 5 the bit error rate (BER) of the digitally coded radio signal received is measured by means of a bit error measuring/correction circuit and this value is fed to the control unit 3. If the bit error rate exceeds a predetermined value (i.e. the reception quality drops below a predetermined value) stored in memory 15, then switchover to VHF-FM occurs by means of the control unit if the value is exceeded once, several times or continuously. If the radio receiver is tuned to VHF-FM reception of a certain station anyway and reproduces this, then switchover to reproduction via the DAB receiving path 5 with, preferably, simultaneous muting of the analog receiving path 6 takes place if a signal from the bit error measuring/correction circuit is present indicating that the DAB reception quality lies sufficiently above a predetermined value. Particularly in areas in which already a VHF-FM radio signal but not the corresponding DAB radio signal for the current station can be received in adequate quality, it is advisable to maintain the VHF-FM reception although a switchover to DAB is possible.

Figure 3:
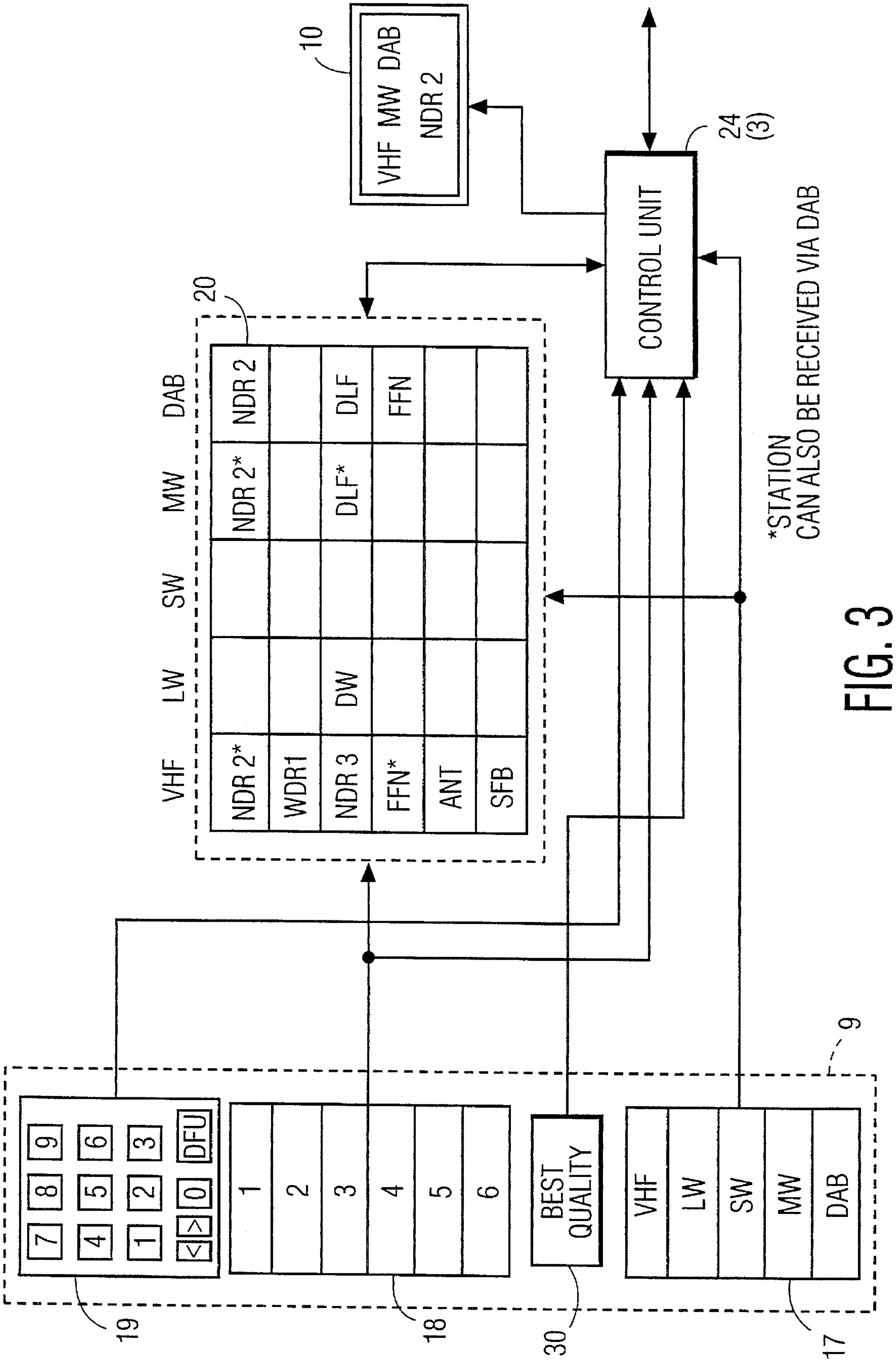
FIG. 3 a block circuit diagram of a operating unit for a radio receiver according to FIG. 1.

FIG. 3 is a block circuit diagram of an advantageous operating unit 9 for the radio receiver 0 according to FIG. 1. The operating unit 9 comprises waveband selector keys 17, programmable memory location selector keys 18, a "best quality" key 30, a reception frequency input and channel number input 19 with numerical keyboard as well as a station memory 20. The keys 17, 18 are connected to both the station memory 20 and a control unit 24 which is identical to control unit 3 or built separately in the radio receiver. The input unit 19 is connected to the control unit 24. The memory selector keys 18, like the channel number input 19, are suitable for setting the operation of both VHF-FM reception and DAB. When programming the memory location selector keys 17, the control unit registers whether the station in waveband X assigned to a station key Y can also be received via DAB. If this is the case then, automatically or after operating key 30 or the DAB band key 17, the corresponding station location is assigned to the same station key 18 for the DAB band and the corresponding data for the station tuning is stored in the appropriate location in the station memory 20. Programming can thus be simplified. This method of programming can also be carried out in the opposite direction, i.e. from DAB band locations to other reception band locations.

In the present example in FIG. 3, it has been established, by the control unit through evaluating the first control signals, that the stations NDR 2 and FFN can also be received via DAB. The corresponding station location is automatically entered in the memory locations for the corresponding keys 18 (1 and 4) in the DAB band. The chief purpose of the operating unit is that a station selected by the user is always offered to him/her in the best reproduction quality. In doing this, under certain circumstances, he/she may only become aware through the reproduction quality or the display unit 10, of the fact that when calling up a VHF-FM or another analog station, the receiver automatically changes to DAB or DSR reception.

Figure 5:
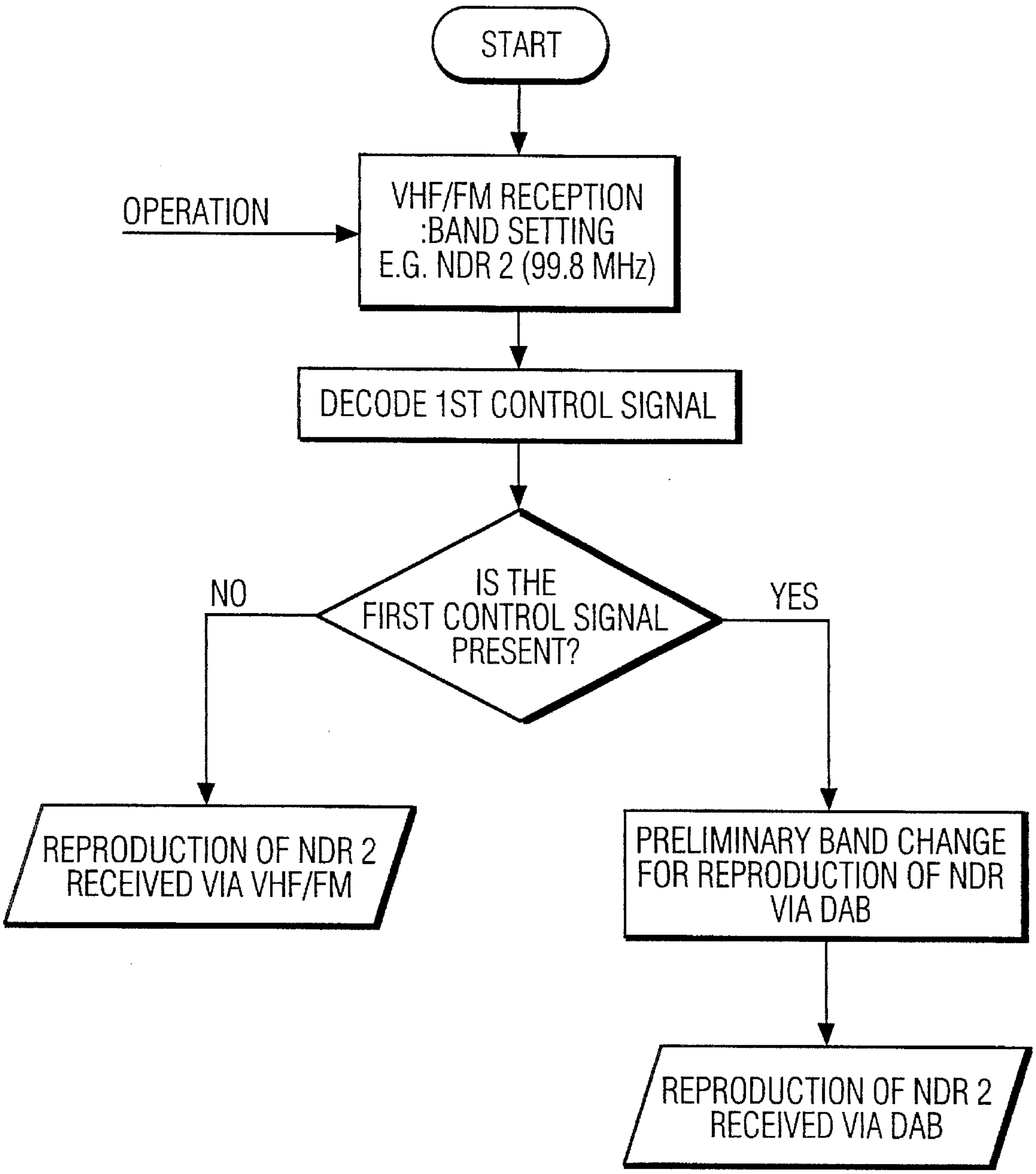
FIG. 5 a flow chart of an operating unit.

If, in the present example, the VHF band is now selected by the user, then the control unit switches over the receiver to DAB reception upon calling up memory keys one and four automatically or only after actuating key 30 "best quality."Subsequent actuation of key Two switches back to VHF reception and the station WDR 1 assigned to this is tuned in (see also FIG. 5). The VHF-FM band selected using a band selector key, but not the selected station, is quitted, therefore, upon actuating key 18 if the correspondingly selected station can also be received via DAB.

If a station can be received via both VHF and DAB, then the corresponding memory location in the station memory is marked with a binary identification signal. For a rapid switchover the control unit then merely needs to evaluate the identification signal and perform the appropriate switchings and station adjustments. When a station has been called up, the display unit 10 shows not only the station name (here NDR 2) and the the current band name (here DAB) but also alternative waveband names (here VHF and MW) over which NDR 2 can also be received. For switching over to the alternative bands VHF or MW, the corresponding band selection key 17 is actuated.

The reception frequency input unit or numerical keypad 19 (with ten keys) is suitable for direct selection of a station via DAB as well as VHF-FM/AM. As the station location for DAB or DSR stations and for television stations as well is normally a two-digit number, it is distinguished principally from a selected frequency value which always has more than two digits. Using an evaluation circuit in the control unit 3, it can be determined without any doubt, after two digits have been entered, whether or not DAB reception is being called up with the selected band. Therefore, selection of all receivable stations is possible also without actuating the band selection keys 17 and/or the memory location selector keys 18. The input unit 19 preferably comprises a data release key DFÜ with 'enter' function. A data release of the number typed in for the station location can, however, also be carried out using key 30 or the DAB key. Hereby, it is advantageous if each station has its own numerical station location characteristic. Preferably, as alternative, however, the numerical keypad 19 is connected to a decimal-to-binary converter in the control unit which generates a binary word, 8 bits in length, from an entered number between 0 and 255, whereby the allocation between a decimal number and a binary value can also be individually determined by the user. With FM or AM or DAB/DSR operation, the binary value for the decimal number entered is then evaluated by the control unit as a station reference number. The station reference number is a part of the PI code (bits 9 through 16) transmitted with RDS for the desired station and is stored in the station memory 20. As each station is assigned an individual station reference number or, respectively, print image data, calling up a station is, therefore, also possible through input via the numerical keypad without the user having to know the respective reception frequency. By comparing the stored PI codes or, respectively, the station reference numbers, the receiver sets the required reception frequency or rather, the desired station. Under certain circumstances, for storing the PI code, a station search must be initiated at first so that the receiver is "introduced" to the stations which can be received in its area as well as their station reference numbers.

The radio broadcast receiver in FIG. 1 already has a very compact construction in terms of the circuitry because many componentries are utilized commonly for both receiver sections. In individual cases it is quite conceivable to provide some componentries separately for both receiving paths but to jointly use them for both.

Figure 4:
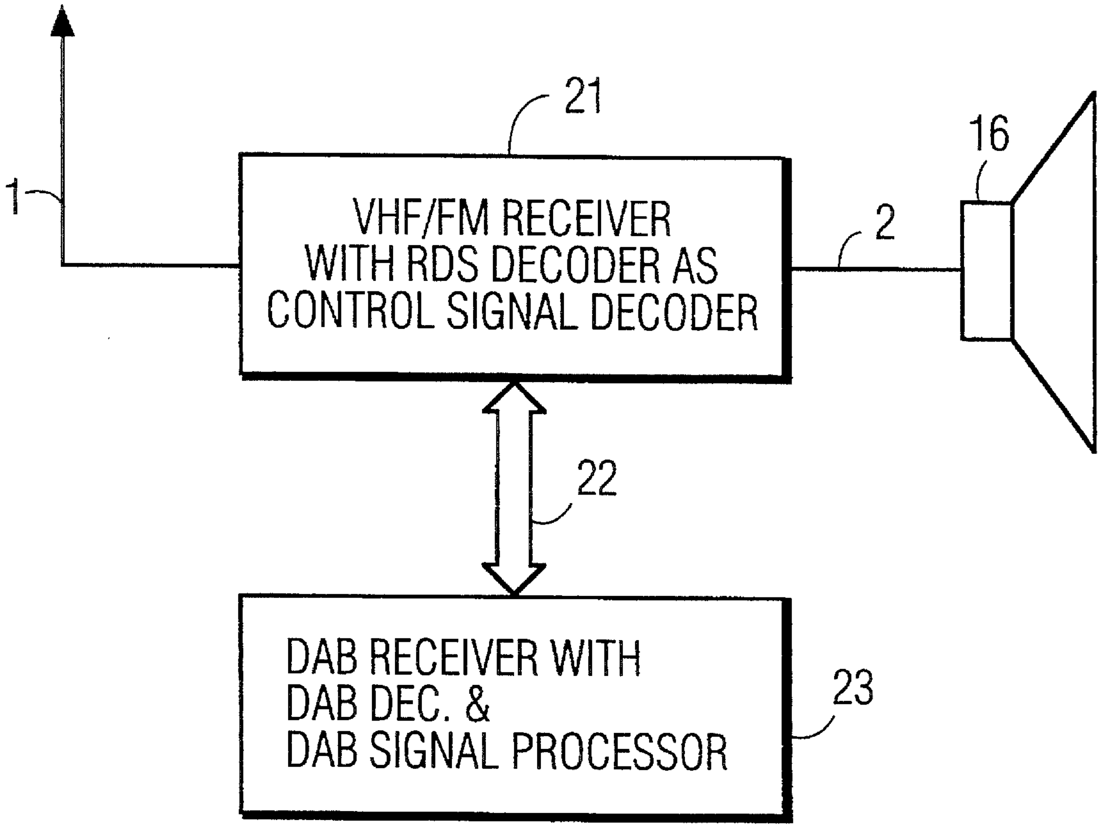
FIG. 4 a block circuit diagram of a VHF-FM receiver which is connected via a trip line to a DAB receiver.

In particular, if a separate VHF-FM receiver is wired together with a separate DAB or DSR receiver, for example, for the purpose of retrofitting, then only a few componentries can be utilized jointly for both receivers. FIG. 4 shows how such a retrofitting can be arranged for a VHF-FM receiver 21. The decisive thing in this case is a common interface 22 via which the control data as well as the wanted data is fed from the DAB receiver section 23 to the VHF receiver section and vice versa. The term interface means, in particular, the inputs and outputs of both receiver sections as well as the corresponding lines between the inputs and outputs. The VHF-FM receiver 21 comprises an aerial 1 and loudspeaker 16 for the reproduction and all the circuit sections required for the reception, processing and reproduction of analog audio signals. The DAB receiver 23 connected to the VHF-FM receiver via an interface 22 comprises, like receiver 21, its own operating unit, indicator and LF signal processing circuit (not illustrated). The DAB receiver 23 can be connected directly to the aerial output via interface 22. Furthermore, a bidirectional trip line is provided in the interface via which the first or second control signals are fed to the respective other receiver for the purpose of control. By means of the interface, a common voltage supply to both receivers is also possible. The LF signals at the output of the DAB/LF stage are fed via the interface directly to the loudspeakers 16. The setting of the reproduction parameters such as volume, balance, stereo/mono, etc. is possible alternatively with either the operating units of both receivers or that of one receiver. The corresponding operating control signals from the DAB receiver are also fed via interface 22 to the VHF-FM receiver and processed there. The VHF-FM receiver 20 comprises, like the receiver section 6, an RDS decoder and an RDS signal processing circuit suitable for this. If a first control signal, transmitted with an RDS signal, is received, then a switching pulse is fed to the DAB receiver which switches on the DAB receiver and calls up the station location assigned to the station currently being received via VHF-FM.

FIG. 6 shows a VHF-FM transmitter or, respectively, a VHF-FM transmitter arrangement 60, which comprises a transmitting antenna 61, a VHF-FM modulator unit 62, a first control signal decoder 63 and a mixer 64. The station signals P1 are fed from a broadcast studio (not illustrated) to the transmitter arrangement 60 via a data input 65. The control signal encoder supplies the first control signal via output 66 to an input 67 on the mixer 64 which mixes the first control signal with the radio signal from the VHF-FM modulator unit 62 and modulates it therewith. In the present example, the first control signal is in the VHF-FM radio signal a pilto carrier or an auxiliary frequency which lies at a distance of M times 19 kHz away from the carrier frequency. 'M' is a natural number, for example, four. The mixed output signal from the mixer is broadcast via the antenna 61 and can be received by a VHF-FM receiver. Only if the current station P1 is also broadcast via digital broadcasting DAB or DSR by the transmitter arrangement 60 or another transmitter Sn, is the first control signal also sent out. Otherwise not. The first control signal can be decoded on the receiver side in a suitable control signal decoder in the radio broadcast receiver and used in further processing, as already described, for controlling a DAB receiver.

A transmitter arrangement S2 (not illustrated) according to claim 17 can be constructed accordingly with a second control signal encoder for generating the second control signal, whereby the second control signal or first rating (identification data) (see claim 8) is inserted as auxiliary signals in the digital signal stream.

Figure 9:
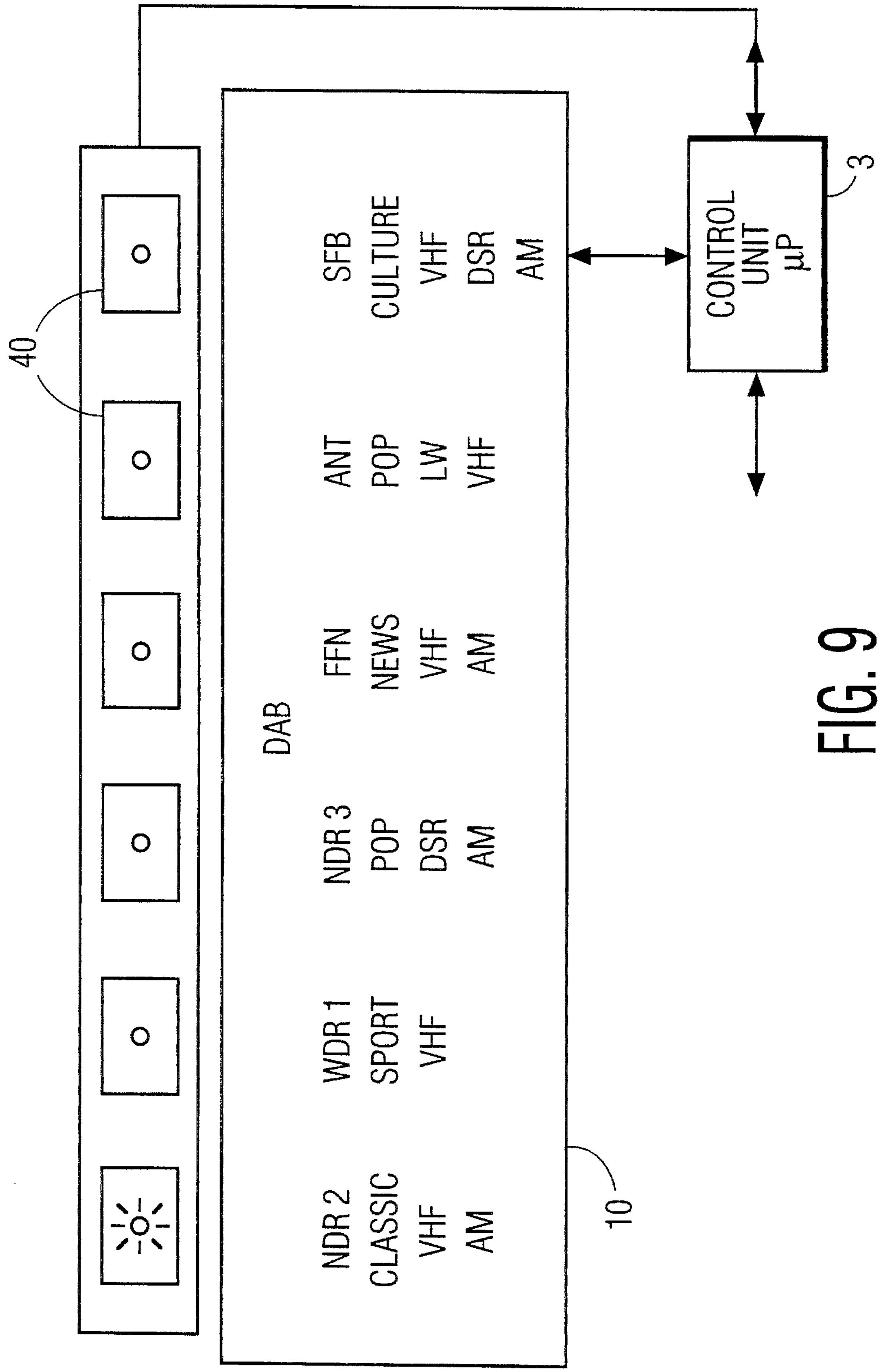
FIG. 9 a constructional design for a display unit.

As already described above, with DAB several, preferably six, stereo stations interlaced with each other according to the COFDM technique on a multitude of carrier frequencies are to be transmitted. Thus, the audio signals, but also the signals accompanying the stations, of, for example, six stations, are contained in a data frame of a DAB transmission. Preferably, data bits are also transmitted which contain information on the number of stations transmitted in a program transmitted in a COFDM multiplex frame. A signal accompanying a station is also the station identification or station name, for example, NDR 2, FFN, etc., which can be indicated on display 10 as shown in FIG. 3. A DAB receiver which receives a data frame, therefore always receives six stations simultaneously, only one of which is reproduced. It is a great advantage if, on the display 10 of the DAB receiver, the names of all the stations which are transmitted within a data frame are always indicated. As FIG. 9 illustrates, the ease and clarity for setting the desired station is markedly improved through such a display. The DAB receiver 5 or 23 can access each of the stations displayed without resetting the reception frequency in that the corresponding station location of the data frame for which the station signals of the desired station are stored is called up.

With an indicator field such as that shown in FIG. 9, it is sensible, in terms of simplifying the operation, to so allocate the station keys 30 to the indicator field that calling up the desired station is unambiguous. Such an arrangement of the keys for an analog radio receiver is known from DE-PS-2758034. Here, upon calling up a desired station, however, the corresponding reception frequency must first be retuned. Moreover, a multitude of stations which cannot be received at all are shown on the indicator field. Furthermore, in FIG. 9 the number of station keys 30 matches the number of stations transmitted in a multiplex signal and is limited to this.

The indicator field according to FIG. 9 possesses an individual control and is, for instance, formed as a DOT matrix. As already shown in FIG. 3, it can of course also be displayed on which transmission channel, for example, VHF, AM, DSR, etc., an indicated station can also be received, provided that appropriate second control signals are also transmitted via the DAB transmission channel. Furthermore, program category information—news, pop, culture, etc. —allocated to a station can also be indicated if this is transmitted by the station. A suitable marking, for example, changing the size of the characters, bold face, changing the background, etc. in the indicator field for the corresponding station name, or a special marking of the key 40 assigned to this station name, for example, by illuminating an light-emitting diode located in the key, can serve as a means of indicating which station is being reproduced at that moment. Instead of the complete station names of all stations, however, it is also possible to indicate on the display one single-digit sign for each receivable station so that the display itself is of a compact size and requires less space, as shown in FIG. 9.

However, the keys 40 can be omitted if the indicator field has a "tip-in" function or is constructed as a "touch screen" so that a place on the indicator field, at which the desired station is shown, only needs to be touched. After touching the indicator field at this place, a signal is transmitted to the control unit and the desired setting carried out. An display unit or display 10 like the one shown in FIG. 9 can be used for any DAB receiver even if the second control signal is not transmitted and the receiver is not connected to a VHF radio broadcast receiver.

I claim:

1. Method for the transmission of VHF-FM and/or AM radio broadcast signals, comprising temporarily or continuously transmitting a first control signal with this VHF-FM and/or AM radio signal, said first control signal containing an item of control information concerning another, different type of radio broadcast transmission system, said control signal being used for switching on and controlling a radio broadcast receiver for receiving digital radio broadcasting and/or for muting a radio broadcast receiver for the VHF-FM and/or AM radio broadcast signal.

2. Method according to claim 1, wherein the first or a second control signal is transmitted with a program signal if the same program is also being transmitted in the transmission system to which the first or second control signal is allocated.

3. Method according to claim 2, wherein a radio data signal is transmitted with a broadcast VHF-FM and/or AM radio broadcast signal and said data signal is decoded, upon reception of said radio broadcast signal, by an FM and/or AM radio broadcast receiver using a radio data signal decoder as first control signal decoder, and is used in a suitable way, for tuning, display, etc., in said FM/AM radio broadcast receiver, and that the first control signal is transmitted with the radio data signal.

4. Method according to claim 1, wherein the first control signal is transmitted via a channel which is separate from the channel of the digital radio broadcasting.

5. Method according to claim 1, wherein upon reception of the first and/or a second control signal, the VHF-FM and/or AM broadcast receiver and/or the digital receiver processes said control signal in a control data evaluation circuit, stores the result in a memory and/or displays it on a display unit.

6. Radio broadcast receiver having a first radio broadcast receiver section for receiving and for processing the VHF-FM and/or AM radio broadcast signals and a second radio broadcast receiver section for receiving and for processing digitally coded audio signals according to claim 5, wherein the first radio broadcast receiver section is electrically connected or coupled to the second radio broadcast receiver section and that one or more common components off an aerial operating elements, loudspeaker control means voltage supply, auxiliary data decoder, are provided for both radio broadcast receiver sections.

7. Radio broadcast receiver according to claim 6, wherein the radio broadcast receiver contains a central control unit of said control means and a memory which is connected thereto and in which first program identification data for those programs which can be received via digital audio broadcasting are stored, that the first program identification data are compared with second identification data in the control unit which is constructed as a data processing and evaluation circuit in the radio broadcast receiver, that the first identification data are associated with digitally coded radio broadcast system and the second identification data are associated with a VHF-FM and/or AM radio broadcast system, and that the radio broadcast receiver or the first and/or second radio broadcast receiver section is controllable in dependence on the result of a comparison.

8. Radio broadcast receiver according to claim 6, wherein an RDS signal or a part thereof is used as the first control signal for controlling the second receiver section.

9. Radio broadcast receiver according to claim 8, wherein the VHF-FM radio broadcast receiver section and/or digital radio broadcast receiver section comprises a unidirectional and/or bi-directional control output from which the first and/or a second control signal can be picked up.

10. Radio broadcast receiver according to claim 6, wherein the radio broadcast receiver contains a single decoder and/or a single data evaluation circuit which decodes and/or processes the first control signal and/or the radio data signals as well as digitized radio broadcast signals and/or respective auxiliary signals.

11. Radio broadcast receiver according to claim 6, wherein programmable memory location selector keys, a band selection key and a station memory, which are connected to the control unit, are provided for the operation of the radio broadcast receiver, that a same program for VHF-FM and digitally coded radio broadcasting is automatically allocated to a specific memory location selector key in the station memory if this program can be simultaneously received via VHF-FM and digitally coded radio broadcasting.

12. Radio broadcast receiver according to claim 6, wherein the radio broadcast receiver comprises means for the processing of digitally coded signals, that the digitally coded signals are subdivided into a multiplicity of frames, that each frame has at least three segments, namely one segment for indicating the start of a frame one segment with checking information and one segment which contains the audio information, that each frame and/or successive frames comprises and/or comprise audio and auxiliary information from several radio programs, that the auxiliary information comprises a program and/or transmitter identification of each program, transmitted within transmission channel or frame, and/or that the radio broadcast receiver has a display unit on which all the transmitter identification of the programs that are transmitted in a digital radio broadcasting DAB transmission channel in several frames and/or one DAB frame are shown.

13. Radio broadcast receiver according to claim 12, wherein a separate VHF-FM receiver is connected to a separate receiver for digitally coded radio broadcasting via one or more unidirectional and/or bi-directional control lines and/or the control unit.

14. Radio broadcast receiver according to claim 6, wherein the VHF-FM radio broadcast receiver section comprises a microprocessor for evaluating decoded RDS data, that the microprocessor compares the program chain identification data and/or transmitter identification data and/or another reference datum corresponding to a VHF-FM program currently being received with data from a reference list stored in the memory, that the reference list contains information on programs which can be received via digitally coded radio broadcasting, that when the data from the reference list coincides with the RDS data, a control signal and/or control data is sent to a control output of the radio broadcast receiver and/or the coincidence is indicated on the display unit and/or a digital radio broadcast receiver connected to the VHF receiver section is switched on and/or controlled.

15. Transmitter for a VHF-FM and/or AM radio broadcast transmission system according to claim 14, wherein the transmitter comprises a first control signal coder for broadcasting a first control signal that the transmitter broadcasts together with a VHF-FM and/or AM radio broadcast signal of a radio and/or television program if the same transmitter and/or another transmitter also broadcasts the same radio and/or television program via digitally coded radio broadcasting the first control signal being allocated to a radio broadcast transmission system which is not compatible with the VHF-FM and/or AM radio broadcast transmission system.

16. Transmitter for a digital radio broadcast transmission system according to claim 15, wherein the transmitter comprises a second control signal coder for broadcasting a second control signal, the transmitter broadcasts the second control signal with a digitally coded radio broadcast signal of a radio and/or television program if the same transmitter and/or another transmitter also broadcast the same radio and/or television program via VHF-FM and/or AM radio broadcasting, the second control signal being allocated to a radio broadcast transmission system which is not compatible with the digital radio broadcast transmission system.

17. Radio broadcast receiver according to claim 6, wherein switching over from VHF-FM/AM reception/reproduction to digitally coded radio broadcast reception/reproduction occurs automatically or only after operating a key of the operating element if the data processing and evaluation circuit and/or control unit establishes, by means of the evaluation of the control signal by the control data evaluation circuit, that a received VHF-FM/AM program is also being transmitted via digital radio broadcasting and/or can be received with adequate quality.

18. Radio broadcast receiver according to claim 17, wherein switching over from digitally coded radio broadcast reception of a program to VHF-FM or AM reception of the corresponding program occurs automatically or after actuation of a key if the receiver approaches a propagation limit of the DAB broadcasting zone and/or an error correction of the digitally coded audio data in an error correcting circuit in the second receiver section fails.

19. Method for the transmission of digitally coded radio broadcast signals comprising temporarily or continuously transmitting a second control signal with the digitally coded radio broadcast signal, said second control signal containing an item of control information concerning another, different type of radio broadcast transmission system VHF-FM and/or AM, said second control signal being used for switching on and controlling a VHF-FM and/or AM radio broadcast receiver and/or for muting a radio broadcast receiver for the digitally coded radio broadcast signal.

20. Method according to claim 19, wherein an auxiliary signal is transmitted with the broadcast digitally coded radio broadcast signal and, upon reception of the digitally coded radio broadcast signal, said auxiliary signal is decoded by a radio broadcast receiver for digital radio broadcasting and is used in a suitable way, for tuning-in a program, display, etc., and that the second control signal is transmitted with the auxiliary signal.

* * * * *